Patented Jan. 7, 1930

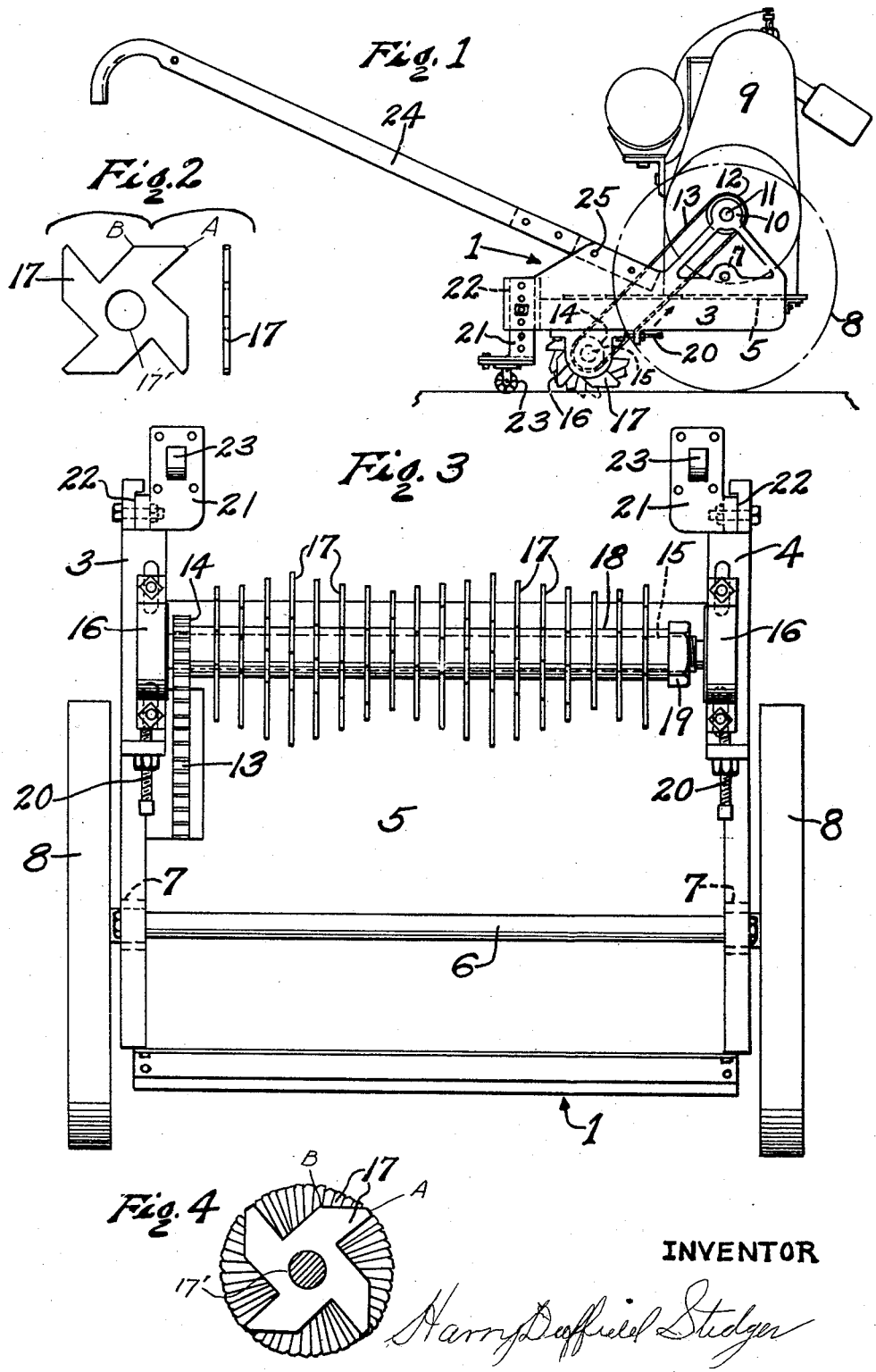

1,742,563

UNITED STATES PATENT OFFICE

HARRY DUFFIELD STIDGER, OF LONG BEACH, CALIFORNIA

LAWN CULTIVATOR

Application filed September 19, 1927. Serial No. 220,398.

An object of this invention is to break up grass mats in the lawns, thereby giving the other grasses a chance to grow and making the lawn as a whole send up fresh green shoots.

An object is to raise the runners of creeping grasses so that they may be cut off by a mower.

An object is cultivation by breaking up the hard crust on the surface of the soil around the grass stems.

An object is durability, simplicity, and cheapness of construction.

Another object is to provide a machine that will do the work of raking a lawn by mechanical means, thus doing away with the work of hand raking.

Other objects, advantages and features of the invention will appear from the accompanying drawings, the subjoined detailed description and the appended claims.

The invention is not limited to the specific construction shown, and it is understood that forms of embodiment other than those shown may be employed without departing from the invention or from the principles herein disclosed and embodied in the mechanism herein set forth and claimed.

The accompanying drawings illustrate the invention.

Fig. 1 is a side elevation of the machine, showing the means for operating the cutters, and also showing the method of adjusting the depth of cut.

Fig. 2 is an enlarged detail of one of the cutters showing a side and end view.

Fig. 3 is an enlarged bottom plan view of Figure 1, showing the cutters and adjustment for the cutters and omitting the handles.

Fig. 4 is a detail view of the cutters and showing the arrangement of the cutters on the shaft.

The invention comprises a main body 1 provided with side castings 3 and 4 and a sheet iron floor plate 5. The sides are tied together by a rod 6, and provided with bosses 7, that carry the trunnions on which the wheels 8 are mounted. Upon the floor plate 5 the engine 9 is mounted.

The side casting 3 is provided with a drive shaft bearing 10 in which is journaled the tail shaft 11. Fixed to the drive shaft is a sprocket 12 over which passes the chain 13 that drives the sprocket 14 fixed to the shaft 15 and which is journaled in the bearings 16 that are fixed to the sides 3 and 4.

Cutters 17 are provided with circular openings round holes 17' that permits any cutter to slip when caught by a stone or root and are mounted on the mandrel 15 and separated by the spacers 18 and locked in place by the nut 19 which forces them against the sprocket 14 that is fixed to the mandrel 15.

In Fig. 3 are shown adjusting screws 20 that provide means for taking up any slack that may occur in the chain 13 by pushing the bearings 16 backward.

The depth of cut that may be taken by the cutters is regulated by the raising or lowering of the rear end of the sides 3 and 4 on the brackets 21 that slide in the guides 22 which brackets carry the castors 23 that rest upon the ground.

The machine is directed by means of handles 24 that are fixed to the sides 3 and 4 by the bolts 25.

In operation the engine is started in the usual manner and drives the cutters 17 in a direction contrary to the motion of the machine by means of the drive shaft 11, through the sprocket 12 and chain 13 that drives the sprocket 14 on the shaft 15 upon which the cutters 17 are mounted.

The machine is then directed over the ground by the operator and the cutters break up the soil and weeds. The cutter 17 is provided with cutting points A and heels B that are arranged and adapted as shown in Figs. 2, 3 and 4, to give uniform cutting action along with strength and durability.

I claim:

1. A lawn cultivator having a frame comprising a base plate, integral sides, a tie rod bracing the sides, trunnions carried by the sides, supporting wheels mounted in said trunnions, an engine supported by the base plate, a drive shaft extending from the engine and journalled in the side, a sprocket on said shaft, adjustable castors supporting the rear end of the frame, a shaft journalled in the frame, a sprocket thereon, a series of cutters on said shaft, and a chain connecting the sprockets.

2. A lawn cultivator having a frame comprising a base plate, integral sides, a tie rod bracing the sides, trunnions carried by the sides, supporting wheels mounted in said trunnions, an engine supported by the base plate, a drive shaft extending from the engine and journalled in one of the sides, a sprocket on said shaft, adjustable castors supporting the rear end of the frame, handles secured to the frame, a shaft journalled in the frame, a sprocket thereon, a series of cutters arranged spirally on the shaft, means for retaining said cutters in operative position, the cutters being constructed to turn upon the shaft when their rotation is obstructed by some unyielding object.

3. A lawn cultivator having a frame comprising a base plate formed with sides, trunnions carried by said sides, supporting wheels mounted in said trunnions, an engine supported by said base plate, a drive shaft extending from the engine and journalled in said sides, a sprocket on said drive shaft, castors supporting the rear end of said frame, handles secured to said frame, a shaft carried by said frame, a sprocket mounted on said last mentioned shaft, a series of cutters arranged spirally on said shaft, spacing elements dispersed between said cutters and means for retaining said cutters in operative position on said shaft.

4. A cultivator comprising a frame including a base having upright sides, a shaft mounted on said sides, supporting wheels on said shaft, an engine supported on said baseplate, a drive shaft extending from said engine and journalled in one of the sides, a sprocket on said drive shaft, adjustable castor means supporting the rear end of said frame, guide handles on said frame, a shaft journalled in said frame, a sprocket on said last mentioned shaft, a series of spirally arranged cutters on said last mentioned shaft, and elements spacing said cutters on said shaft and retaining said cutters thereon, said cutters being arranged to turn on said shaft when their rotation is obstructed.

In testimony whereof, I have hereunto set my hand at Long Beach, California.

HARRY DUFFIELD STIDGER.